United States Patent Office 3,373,133
Patented Mar. 12, 1968

3,373,133
ANTICORROSIVE COMPOSITIONS
Georg Stern and Felix Munk, Haifa, and Simha Harel, Motzkin, Israel, assignors to Chemicals and Phosphate, Ltd., Haifa Bay, Israel, a company of Israel
No Drawing. Filed July 31, 1964, Ser. No. 386,739
Claims priority, application Israel, Aug. 6, 1963, 19,742
3 Claims. (Cl. 260—37)

The present invention concerns coating compositions for the protection of metals against corrosion. The compositions with which the present invention is concerned will be referred to hereinafter as "protective paint compositions" and the coats produced therefrom as "protective coats."

The protective paint compositions with which the present invention is concerned are of the kind that are applied directly to the metal substrate, i.e. of the kind of paints that are referred to in the art as base paints or primer paints.

Primer paints comprise solvents, binders such as, for example, alkyd resins, and at least one pigment acting as protective agent. From among known primer paints there may be mentioned in particular those containing as pigment zinc-potassium-chromate either alone or in combination with other pigments, as well as those in which the pigment is red lead oxide.

Known primer paints are not fully satisfactory. Thus, during the curing of the binder which may take a week or even more, the protection against strong atmospheric attack is insufficient. Moreover, the lifetime of protective coats produced from known primer paints is limited, in particular if they remain under corrosive conditions uncoated, i.e., without a top coat. Thus, for example, an iron substratum with an uncoated zinc-potassium-chromate coat develops rust after some time. Moreover, known protective primer coats such as, for example, zinc-potassium-chromate and red lead oxide coats are vulnerable to attack by corrosive agents such as, for example, chlorides.

It is the object of the present invention to provide new improved protective paint compositions which yield protective coats that may, if desired, be left without a top coat.

The invention consists in protective paint compositions containing as pigment a potassium-chromium-fluoride of the formula

$$(KF)_a(HF)_b CrF_3 [Cr(OH)_3]_c (H_2O)_d$$

wherein $a$ is a number from 1.5 to 3, $b$ is a number from 0 to 1, $c$ is a number from 0 to 1, $d$ is a number from 0 to 3.

The above potassium-chromium-fluorides need as a rule not be completely pure and can be used in technical grade purity.

In addition to the above pigments, the protective paint compositions according to the invention may also contain other pigments such as, for example, zinc-potassium-chromate, red iron oxide, zinc oxide, and titanium dioxide, suspending agents such as, for example, talcum, bentonite and alum stearate, and also fillers such as, for example, barite and mica.

The remaining ingredients of the protective paint compositions according to the invention are conventional and include binders, solvents and driers. Each of these ingredients and any desired further additives may be selected from the wide range of products used hitherto in the art. Thus, the binders that can be used for the formulation of protective paint compositions according to the invention include alkyd resins, phenolic resin varnishes, epoxy resins, chlorinated rubber, polyvinyl copolymers and many others.

Quite generally, the protective paint compositions according to the invention are composed as follows:

| | Percent by weight |
|---|---|
| Potassium-chromium-fluoride | 10–55 |
| Fillers and/or other pigments | 0–35 |
| Binder-solids | 14–35 |
| Solvents and driers | Balance |

As a rule, the nature of the binder and the relative proportions of the ingredients will depend on the conditions to which the primer coat is to be exposed. Thus, in some cases it will be preferable to use long oil alkyd resin as binder, to confine the amount of potassium-chromium-fluoride to about 25% by weight and to incorporate as the only further solid ingredient a suspending agent, in order to obtain in this way good weathering resistance. In other cases it may be preferable to use as binder short phenolic resin varnishes, to confine the potassium-chromium-fluoride content to about 20% by weight and to incorporate in addition also other pigments such as zinc-oxide and iron-oxide in order to obtain in this way good resistance against acidic corrosion. In still other cases a medium oil alkyd resin will be used as binder in combination with zinc-oxide as further pigment in order to obtain good resistance to underwater conditions.

Comparative tests carried out with protective coats according to the invention on the one hand and with conventional potassium-zinc-chromate and red lead-oxide protective coats on the other hand, using in each case mechanically cleaned steel or iron as substratum, have shown that the former are superior to the latter in the following respects:

(1) Resistance to weathering, even in the presence of gaseous chlorine, chlorides and ammonium sulphate in the atmosphere;
(2) Resistance under mild acidic conditions;
(3) Resistance in the presence of a salt spray;
(4) Resistance without top coat for at least three months to severe weathering and other corrosion-inducing conditions;
(5) Resistance to both weathering and corrosion when covered with alkyd top coats;
(6) Resistance to weathering and corrosion when using quick-drying varnishes or binders, which is of particular importance in quick repair work and industrial maintenance.

The potassium-chromium-fluorides which are used as pigments in the protective primer compositions according to the invention can be prepared, inter alia, by the processes described in U.S. patent application No. 321,431, now abandoned, which comprises reacting with each other an aqueous solution A containing a Cr III salt and an aqueous solution B containing KF, at least one of said solutions A and B being sufficiently acidic so that the reaction mixture contains free HF, allowing the desired product to precipitate and separating, washing and drying the precipitate.

The invention is illustrated by the following examples to which it is not limited.

I. PREPARATION OF POTASSIUM-CHROMIUM-FLUORIDE

*Example 1*

A solution A was prepared by dissolving 175 grams of $K_2Cr_2O_7$ in 1 liter of water. Gaseous $SO_2$ was introduced into the solution until the reduction of the hexavalent chromium into tervalent chromium was complete as established by means of the diphenylamine reagent.

Upon completion of the reduction, 24.7 ml. of $H_2SO_4$ of specific gravity 1.81 was added. The final solution was diluted to 1540 ml. and contained 39.4 g. of chromium per liter.

A solution B was prepared by dissolving 524 g. of KF in water and diluting to a volume of 1540 ml. The concentration of the resulting solution was 340 g. KF/l.

The two solutions were slowly poured together at such rates of flow that the concentration of KF in the reaction mixture over the stoichiometric concentration calculated for $K_3CrF_6$ was 30%. The reaction mixture was held at a temperature of 90° C. and the pH in the mixture was 6.7. A greenish precipitate formed and after 45 minutes preciiptation was completed. The precipitate was filtered off, washed three times with warm water and dried at 105° until constant weight.

321 g. of dried product was obtained containing 18.3% Cr corresponding to a yield of 97% calculated on the chromium used.

Example 2

Solutions A and B were prepared as in Example 1. The solutions were then combined in the same manner described in Example 1 with the difference that the relative rates of flow of solutions A and B were so controlled that the excess of KF in the reaction mixture over the stoichiometric concentration calculated for $K_3CrF_6$ was only 5%. The remainder of the procedure was the same.

289 g. of dried product was obtained containing 20.8% Cr corresponding to a yield of 95.8% calculated on the chromium used.

II. PREPARATION OF PROTECTIVE PRIMER COMPOSITIONS

Example 3

The following composition was prepared:

| | Percent |
|---|---|
| Potassium-chrom-fluoride (prepared according to Example 1) | 11.6 |
| Potassium-zinc-chromate | 11.6 |
| Zinc oxide | 8.3 |
| Red iron oxide | 2.0 |
| Talcum | 9.5 |
| Alkyd TT-R-266 II (U.S. Fed. Specification) | 30.0 |
| White spirit | 23.0 |
| Driers | 4.0 |

This composition was applied to mild steel panels without any surface preparation and the resulting primer coat remained intact after 15 months of outdoor weathering in the Haifa area (Israel) in a position of 45° against south.

Example 4

The following protective primer composition was prepared:

| | Percent |
|---|---|
| Potassium-chrom-fluoride (prepared according to Example 1) | 26.0 |
| Zinc oxide | 8.0 |
| Talcum | 11.0 |
| Alkyd resin TT-R-266 II (U.S. Fed. Specification) | 30.0 |
| White spirit | 20.0 |
| Driers | 5.0 |

This composition was applied to the same substratum as in Example 1 as a primer coat of 30 micron thickness. This coat withstood more than 720 hours under the conditions of the saltspray test, ASTM B-117-57, without developement of any corrosion on the steel.

Example 5

The following protective primer composition was prepared:

| | Percent |
|---|---|
| Potassium-chrom-fluoride (prepared according to Example 2) | 20.0 |
| Zinc oxide | 10.0 |
| Red iron oxide | 10.0 |
| Talcum | 5.0 |
| Phenolic resin varnish (40% solids, straight phenolic resin: linseed oil:tung oil=1:1:1) | 54.0 |

The primer coats produced from this composition are especially resistant to indoor-chemical attacks when applied directly on steel or iron, even when the substratum is only mechanically cleaned.

Example 6

The following protective primer composition was prepared:

| | Percent |
|---|---|
| Potassium-chrom-fluoride (commercial material from the Harshaw Chemical Co.) | 36.0 |
| Talcum | 6.4 |
| Aluminum-stearate | 0.5 |
| Alkyd resin TT-R-266 I A (Fed. Specification) | 30.0 |
| Dipentene | 2.0 |
| White spirit | 20.0 |
| Driers | 0.8 |

The primer coats prepared from this composition proved to be the best examined so far under all-around conditions when used over rusted steel or iron.

Example 7

The following protective primer composition was prepared:

| | Percent |
|---|---|
| Potassium-chrom-fluoride (prepared according to Example 1) | 16.8 |
| Potassium-zinc-chromate | 4.8 |
| Zinc oxide | 18.5 |
| Talcum | 6.5 |
| Aluminium stearate | 0.5 |
| Alkyd-resin TT-R-266 I A (U.S. Fed. Specification) | 30.0 |
| White spirit | 20.0 |
| Driers | 0.8 |

Coats prepared from this composition turned out to be superior to all known primer coats upon exposure under industrial conditions, e.g., to sulphuric acid, ammonia, superphosphate, electrolytic chlorine-plants atmosphere, and its lifetime was longer by several months than that of any other primer coat.

III. COMPARATIVE TESTS

Example 8

All the protective primer compositions according to Examples 3 to 7 were compared with a red lead primer composition containing a synthetic resin binder and a potassium-zinc-chromate primer composition composed according to U.S. Fed. Specification formula JAN-P-725. The respective compositions were sprayed on sandblasted, cold-rolled steel panels in 30 micron thick films and the coated panels were submitted to the ASTM-saltspray test. The red lead and zinc-chromate coats failed after ten days while the primer coat from the compositions according to the invention remained intact after 30 days. After 30 days sample panels with primer coats according to the invention were withdrawn and the coat stripped: the surface was intact.

Example 9

Open weather exposure on the roof of a building in the Neve Shaanan area (Mount Carmel, Haifa, Israel).

The substratum coats were the same as in Example 8 and the results were as follows:

Potassium-zinc-chromate and red lead coats—beginning of failure after 11 months
Coats from the compositions according to the invention—no change after 15 months.

*Example 10*

Exposure in 4 sites, one industrial with $SO_2$, $NH_3$ and superphosphate dust in the atmosphere, another industrial with gaseous chlorine in the atmosphere, and two near the sea. The substratum in each case was a mechanically cleaned, cold-rolled steel and the coats were produced from the compositions in the form of 30 micron thick films without a top coat. The samples were exposed for three months whereafter they were all collected and examined. The results, expressed in terms of samples on which the coat remained intact, are the following:

Red lead coats _____ 0
Potassium-zinc-chromate coats _____ 1
Coats according to the invention _____ 4

The experiments were repeated in a slightly modified manner in that the substrata were sand-blasted, cold-rolled steel panels and alkyd resin top coats were applied on the primer coats. The samples were again exposed for three months at the same sites and thereafter collected and examined. The results, expressed in terms of number of samples remaining intact were the following:

Red lead coats _____ 2
Potassium-zinc-chromate coats _____ 0
Coats according to the invention _____ 4

We claim:
1. Protective paint compositions comprising 10–55% by weight of a potassium-chromium-fluoride pigment of the formula

$$(KF)_a(HF)_b CrF_3[Cr(OH)_3]_c(H_2O)_d$$

wherein $a$ is a number of 1.5 to 3, $b$ is a number from 0 to 1, $c$ is a number of 0 to 1, $d$ is a number from 0 to 3, 14–35% by weight of binder solids selected from the group consisting of alkyd resins, phenolic resin varnishes, epoxy resins, chlorinated rubber, and polyvinyl copolymers the balance comprising conventional filters, other pigments, solvents and dryers.
2. Protective paint compositions according to claim 1, containing in addition to the potassium-chromium-fluoride pigment at least one other pigment.
3. Protective paint compositions according to claim 2, wherein said other pigment is a member selected from the group consisting of potassium-zinc-chromate, iron oxide, zinc oxide, titanium oxide.

References Cited
UNITED STATES PATENTS 2,387,528  10/1945  Patterson et al. _____ 106—302
2,415,394   2/1947  Tarr _____ 106—302
3,072,495   1/1963  Pitrot _____ 106—302

OTHER REFERENCES

Mellor, A Comprehensive Treatise on Inorganic & Theoretical Chemistry, vol. 11, 1931, Longmans Green & Co., pp. 363, 364.

TOBIAS E. LEVOW, *Primary Examiner.*
S. E. MOTT, *Assistant Examiner.*

UNITED STATES PATENT OFFICE
CERTIFICATE OF CORRECTION

Patent No. 3,373,133                                       March 12, 1968

Georg Stern et al.

It is hereby certified that error appears in the above numbered patent requiring correction and that the said Letters Patent should read as corrected below.

Column 3, line 2, for "aded" read -- added --; column 6, line 11, for "filters" read -- fillers --.

Signed and sealed this 1st day of October 1968.

(SEAL)
Attest:

Edward M. Fletcher, Jr.                                     EDWARD J. BRENNER
Attesting Officer                                               Commissioner of Patents